J. P. Manny,
Mower.

No. 34,760.    Patented Mar. 25, 1862.

John P. Manny

Witnesses

UNITED STATES PATENT OFFICE.

JOHN P. MANNY, OF ROCKFORD, ILLINOIS.

IMPROVEMENT IN HARVESTERS.

Specification forming part of Letters Patent No. 34,760, dated March 25, 1862.

*To all whom it may concern:*

Be it known that I, JOHN P. MANNY, of Rockford, in the county of Winnebago and State of Illinois, have invented certain new and useful Improvements in Harvesters, of which the following is a full, clear, and exact description, reference being had to the accompanying drawings, which make part of this specification, and in which—

Figure 1:
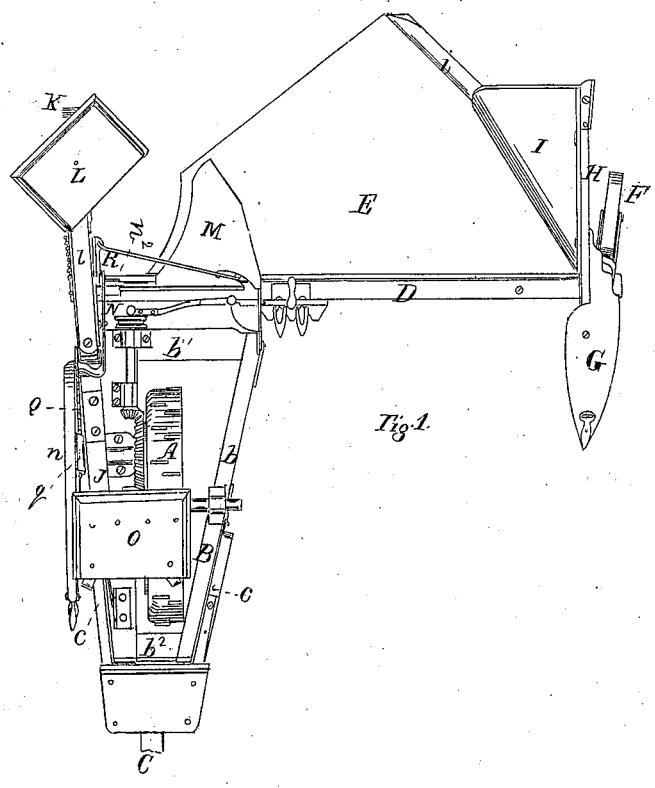
Figure 2:
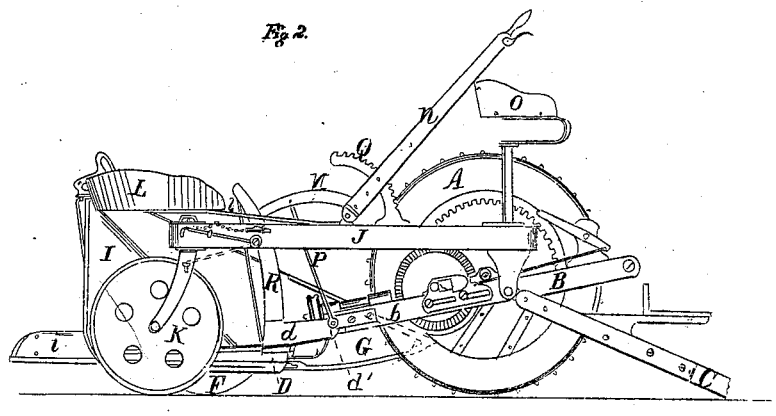

Figure 1 represents a plan or top view of a harvesting-machine embracing my improvements, and Fig. 2 represents a view in elevation of the gearing side of the same.

The improvements claimed under this patent consist, first, in constructing the platform of a harvesting-machine in the form (or very nearly so) of a right-angled triangle, of which the finger-beam forms the hypotenuse, as hereinafter more fully described, whereby I am enabled to discharge the cut grain behind the driving-wheel and out of the path of the machine in cutting the next swath, by drawing it off with equal facility in either a straight, a bent, or a curved path, at pleasure, and thus greatly to facilitate the proper discharge of the gavel, and the adaptability of the machine to the varying circumstances under which it is required to operate; secondly, in combining a triangular platform, of which the finger-beam forms the base, with a raker's seat or position located in rear of the finger-beam and gearing-frame, substantially in the manner hereinafter described, whereby I effect the discharge of each gavel in the manner best adapted to its condition; thirdly, in combining with the platform and raker's stand a foot board or box, which serves both as a foot-board for the raker and as a fence or guard-board to prevent the grain from falling over the gearing side of the platform, where it would be in the way of the caster-wheel which supports the raker's position.

In order to carry out the objects of the invention claimed under this patent, I mount the gearing in an independent frame, which incloses the driving-wheel and is hinged at its rear end to the finger-beam. The outer or divider end of the finger-beam and platform is supported by a caster-wheel. The platform is triangular in shape, its front edge forming the hypotenuse of the triangle. The divider side of the platform slopes inward and backward at an angle of about forty degrees, and is provided with a fence or wing-board to guide the stalks of falling grain inward upon the platform. The platform is made comparatively narrow from front to rear, and its inner side, or that next the gearing, is sloped from the rear toward the gearing-frame at an angle of about fifty degrees. A foot-board upon the gearing side of the platform serves both as a support for the feet of the raker and as a fence to prevent the grain from passing off at that edge of the platform. A strong beam or frame is hinged at its front end to the gear-frame at a point near the axle of the driving-wheel. The rear end of this frame is supported by a caster-wheel, so that the frame itself always remains horizontal or parallel to the surface of the ground, no matter what may be the position of the finger-beam and gearing-frame. The seat or position for the raker is located upon the rear end of this parallel frame at a point behind and above the finger-beam and near its end. The finger-beam is rendered adjustable in height by means of a rod, cord, or chain, one end of which is secured to the main frame, while the other end is attached to a bent lever, operated upon by the driver from his seat, and held in position by a suitable detent.

The accompanying drawings represent a convenient arrangement of parts for carrying out the objects of my invention.

In this instance the driving-wheel A is shown as turning in bearings in a stout frame, B, in which all the driving-gear is supported. This frame is composed of two stout beams, $b\ b^3$, arranged side by side and gradually converging from rear to front, so that the gear-frame is narrower in front than in rear. These side pieces are connected by transverse braces $b'\ b^2$.

The hounds $c$ are rigidly secured to the tongue C, and are made divergent in a degree corresponding with the shape of the gear-frame, to which they are hinged near the axle of the driving-wheel, as shown in the drawings.

The finger-beam D is connected to the rear end of the gearing-frame by means of two lugs or ears, $d$, and hinges $d'$ in such manner as to allow it free vertical play. The platform E and the frame which sustains it are secured to the finger-beam in such a manner as to admit of their being readily removed in order to adapt the machine to mowing. This platform I make of a triangular shape, as shown in Fig. 1 of the drawings, the outer side running back at an angle of about forty degrees to the finger-beam, (which forms the base of the triangle,) while the other side forms an angle with the beam of about fifty degrees, the point of intersection of these sides forming the extreme rear edge of the platform. The inner edge of the platform is cut away in a curved form behind the gearing-frame, in order to afford room for the caster-wheel K to turn, as shown in Fig. 1.

The outer end of the finger-beam is upheld by a caster-wheel, F, and provided with a suitable divider, G, and reel-standard, H to which the latter is hinged, an inclined wing-board, I, (about three feet long,) which serves to deflect the falling stalks inward upon the platform. A fence or guard-board, $i$, prevents the grain from falling off on the outer side of the platform.

One end of a stout horizontal beam, J, is hinged to the gearing-frame B, near the axle of the driving-wheel A, while its other end is sustained by a caster-wheel, K. A raker's seat, L, is mounted upon this frame J just over the caster-wheel K, and is supported by a spring, $l$, to which it is pivoted in such manner as to allow it a free horizontal turning movement on its pivot. An elevated foot-board, M, is placed upon the inner side of the platform, both as a support for the feet of the raker and as a fence to prevent the grain from being swept off at that end of the platform.

The finger-beam is raised and lowered, in this instance, to cut different lengths of stubble in the following manner: A bent lever, N, is pivoted upon the parallel beam J, its handle $n$ extending forward to the driver's seat O. A rod, P, extends from the joint $d'$ to the middle of the bent lever M. A cord or chain extends from the rear end of this bent lever to a pulley on the finger-beam, and thence along the beam to another pulley in the rear end of the divider, and is fastened to the hinder end of the hinged arm which supports the grain-wheel F, which is also a caster-wheel. By this means both ends of the beam are raised or lowered simultaneously. The beam is held at any desired elevation by means of a curved rack, Q, into which a spring-detent upon the lever-handle $n$ takes. The cutting apparatus and platform are maintained in a horizontal position, or nearly so, at all times by means of a curved post or standard, R, rigidly secured to the finger-beam and sliding freely endwise in a slot or clamp on the beam J.

The operation of the machine is as follows: As the machine advances through the field the grain is caught by the reel and swept back upon the cutting apparatus, by which it is severed. The continued movement of the reel then deposits it upon the platform with its butts next the finger-beam. The heads of those stalks which fall upon the wing-board I are deflected inward by it, so as to facilitate their being grasped by the rake, and as the grain is drawn off by it the butts are correspondingly compressed. The raker sits in his seat L with his feet upon the foot-board M, with his face quartering toward the horses. If the grain is tall and straight, I insert the rake into the bundle near the heads and draw it directly backward at a slight angle until the heads are firmly off the platform, when they drop upon the ground, and, catching in the stubble, are drawn entirely off the platform by the forward movement of the machine, and are deposited in a compact gavel sufficiently to one side to be out of the way in cutting the next swath and in a favorable position for binding, the angle at which the guard-board $i$ slopes backward being such as effectually to avoid dragging the grain after it during the forward movement of the machine. If the grain is short and stands upright, I insert the rake into the heads of the stalks lying upon the platform, and turn the grain by a quick pivotal movement of the rake, and discharge it upon the ground with its stalks at right angles to the swath. If the grain be long and lodged or tangled, I pass the outer tooth of the rake over the divider-board and disentangle the grain at that point, (where it is apt to lodge,) then draw the grain directly toward the raker's seat, and push the gavel backward off the platform with the stalks nearly parallel to the swath. When the grain is short and crinkled or badly lodged, I draw the grain backward a little from the cutting apparatus (where it is apt to accumulate, as the reel has but little effect on such short grain) by two or three short strokes of the rake until enough has been accumulated to form a gavel, when I sweep it off backward and discharge it with its stalks at a slight angle to the swath. The position of the raker's seat greatly facilitates these different methods of effecting the discharge, being so far in the rear of the reel (the axis of which in my machine is slightly in advance of the finger-beam) as to enable the raker to reach under it with his rake to grasp the lodged masses which the reel cannot touch. The wide opening at the rear of the platform, where the gavel is discharged, and the peculiar shape of the platform, always leaves it optional with the raker as to the manner in which the gavel shall be discharged, while the inclined wing-board and grain-shield prevent it from falling into the path of the horses in the succeeding tour of the machine.

The machine is of course to be provided with suitable gearing and cutting apparatus, and also with a reel; but I do not deem it necessary here to describe in detail these and other parts of the machine, their construction and operation being well known to all skillful constructers of reapers. Moreover, they form no part of the subject-matter herein claimed.

It is obvious from the foregoing description that by the use of my machine the raker can discharge the grain in either of four different ways, while no other machine with which I am acquainted possesses the capability of discharging the gavel in more than one way. Now, as the condition of the grain is constantly varying, even in different portions of the same field, and as each condition requires a different mode of delivery in order to effect it in the best manner, the advantages of my improvement are manifest.

I do not claim, broadly, under this patent an angular platform, as such has been used in the John H. Manny and other machines, its construction, arrangement, and operation, however, being different from what it is in mine, as hereinbefore fully explained; but

What I claim under this patent as my invention, and desire to secure by Letters Patent, is—

1. The triangular platform E, when constructed and arranged substantially in the manner described, for the purpose set forth.

2. The combination of the triangular platform E with the finger-beam D and raker's stand or seat L, when the whole are arranged in relation to the driving-wheel and substantially in the manner and for the purpose described.

3. The combination of the platform E, foot-board M, and raker's seat L, as and for the purposes described.

In testimony whereof I have hereunto subscribed my name.

JOHN P. MANNY.

Witnesses:
WM. D. BALDWIN,
JOHN S. HOLLINGSHEAD.